United States Patent [19]

Chen

[11] Patent Number: 5,507,330
[45] Date of Patent: Apr. 16, 1996

[54] WORKPIECE FEEDING DEVICE FOR AN EDGE SHAPING APPARATUS

[76] Inventor: Chin-Te Chen, No. 21, Lane 125, Yung-Ho St., Nan Dist., Taichung City, Taiwan

[21] Appl. No.: 497,221

[22] Filed: Jun. 30, 1995

[51] Int. Cl.⁶ ................................................. B27B 31/00
[52] U.S. Cl. .............................. 144/249 B; 144/134 A; 144/246 R; 144/253 J; 198/860.3
[58] Field of Search .................................... 198/289, 624, 198/780, 791, 860.3; 144/114 R, 117 R, 134 R, 134 A, 242 R, 246 R, 249 R, 249 B, 253 J, 247

[56] References Cited

U.S. PATENT DOCUMENTS

| | | | |
|---|---|---|---|
| 208,323 | 9/1878 | Mayo | 144/249 B |
| 2,783,796 | 3/1957 | Patterson | 144/249 B |
| 2,873,776 | 2/1959 | Buttke | 144/247 X |
| 4,662,413 | 5/1987 | Bater | 144/249 B X |
| 5,284,192 | 2/1994 | Sato et al. | 144/247 |

FOREIGN PATENT DOCUMENTS

36747  8/1886  Germany ................. 144/249 B

Primary Examiner—W. Donald Bray
Attorney, Agent, or Firm—Ladas & Parry

[57] ABSTRACT

A workpiece feeding device is to be used with an edge shaping apparatus and includes a base unit, a housing unit, a feeding cylinder unit and a drive unit. The housing unit is mounted uprightly on the base unit and includes a surrounding wall with a front wall portion, and a partition member which is connected integrally to the surrounding wall and which cooperates with the front wall portion so as to confine a pair of upright cylindrical receiving spaces. The front wall portion is formed with a pair of vertical slots to access respectively the cylindrical receiving spaces. The feeding cylinder unit includes a pair of feeding cylinders received respectively in the cylindrical receiving spaces and mounted rotatably on the base unit. The feeding cylinders extend out of the cylindrical receiving spaces via the vertical slots. The drive unit is connected operably to the feeding cylinders and is operable so as to drive rotatably the feeding cylinders.

10 Claims, 7 Drawing Sheets

WORKPIECE FEEDING DEVICE FOR AN EDGE SHAPING APPARATUS

BACKGROUND OF THE INVENTION

1. Field of the Invention

The invention relates to an edge shaping apparatus for wooden workpieces, more particularly to a workpiece feeding device for an edge shaping apparatus to enhance safety features of the edge shaping apparatus when the latter is in use.

2. Description of the Related Art

Figure 1:
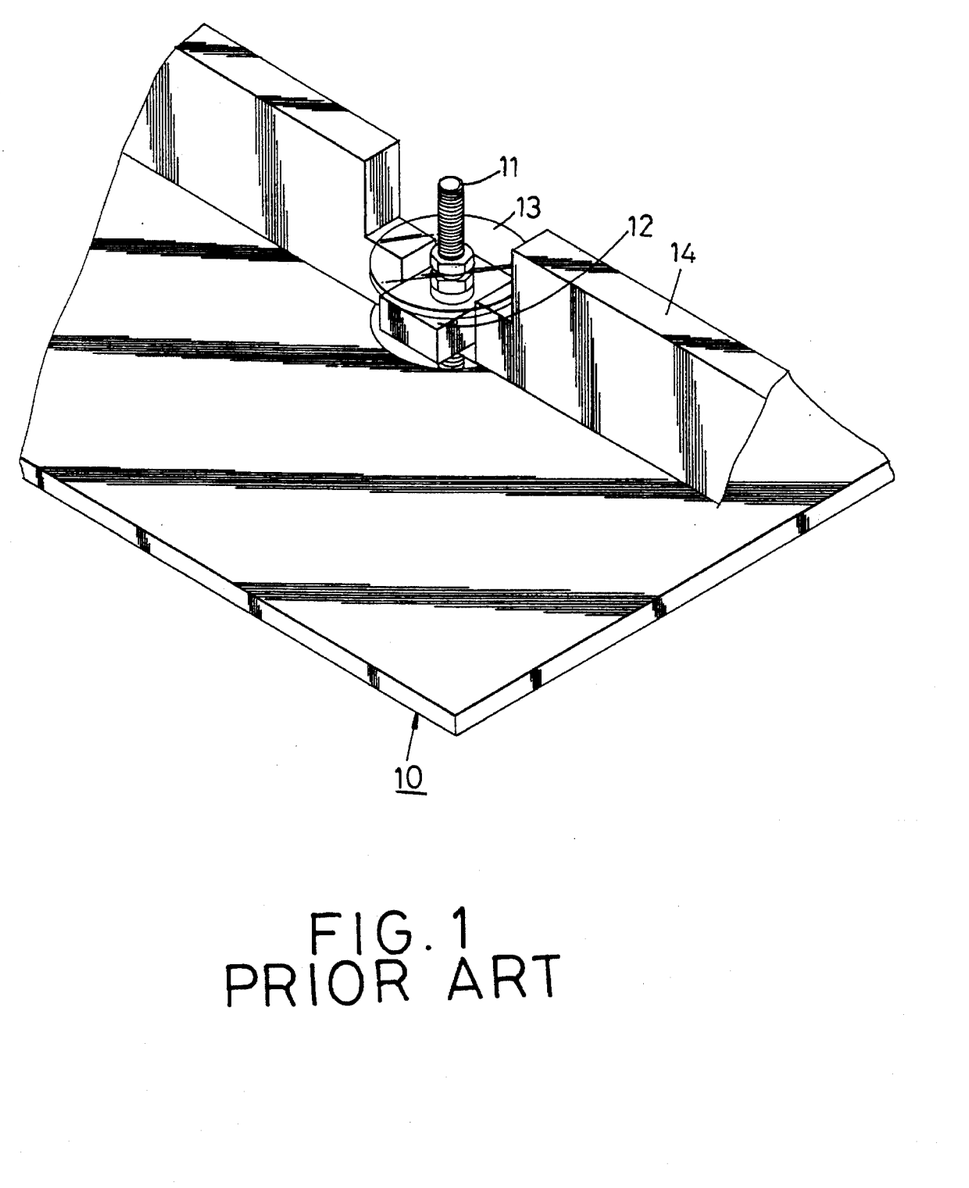
FIG. 1 is an illustration of a conventional edge shaping apparatus.

An edge shaping apparatus is employed to form a desired surface on a wooden workpiece. Referring to FIG. 1, a conventional edge shaping apparatus is shown to comprise a worktable 10, a height-adjustable cutter seat 11 provided on the worktable 10, and a cutter unit 12 mounted on the cutter seat 11 and driven rotatably by a motor (not shown). The cutter unit 12 is mounted replaceably on the cutter seat 11 and is used to form a desired surface on a wooden workpiece (not shown). A cutter guard 13 is mounted on the cutter seat 11 above the cutter unit 12 and serves to prevent wood shavings 22 (see FIG. 2) from affecting the vision of an operator. A support plate unit 14 is mounted uprightly at two sides of the cutter unit 12 to support one edge of the wooden workpiece thereon.

Figure 2:
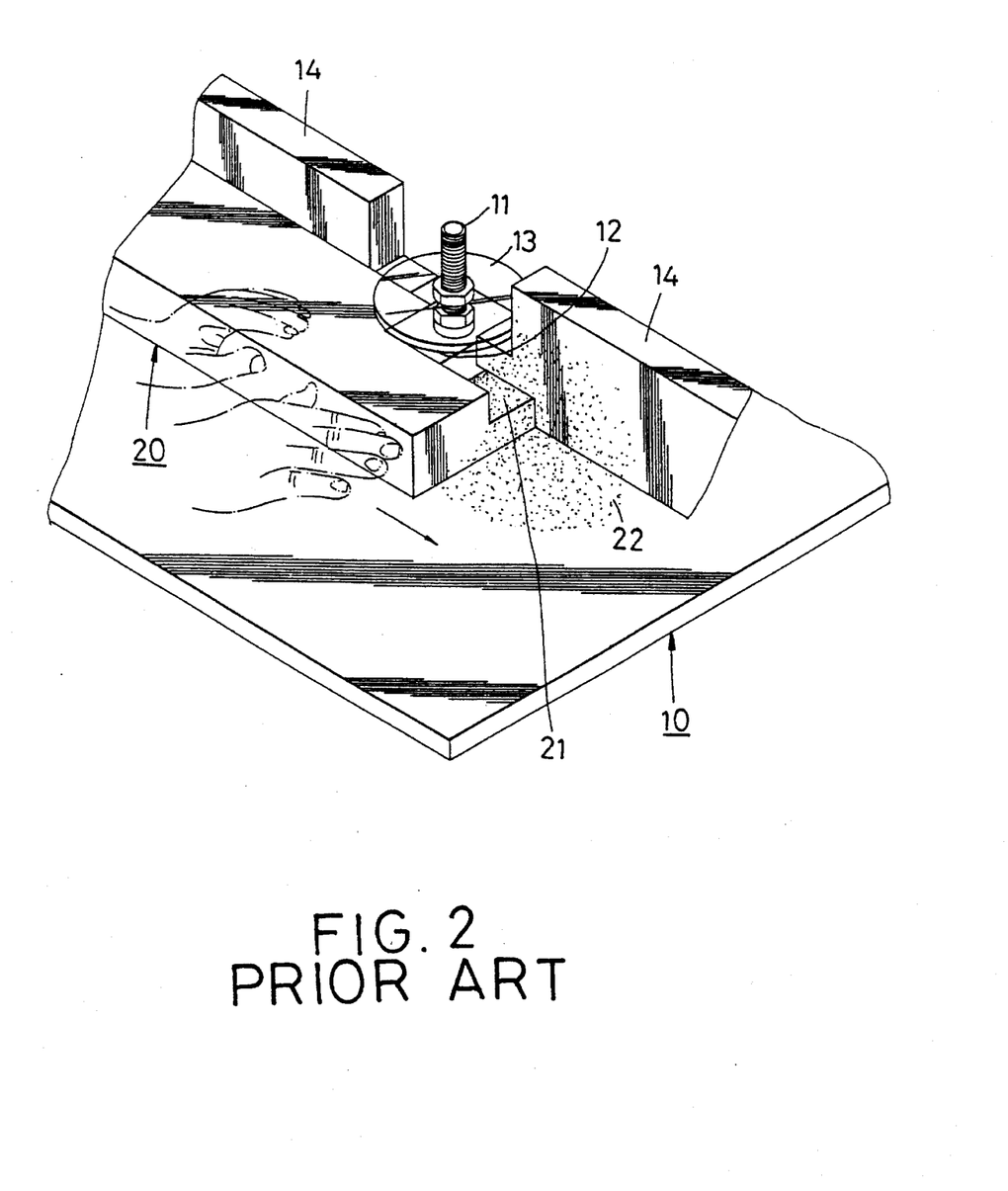
FIG. 2 illustrates how a wooden workpiece is processed when the edge shaping apparatus of FIG. 1 is in use.

FIG. 2 illustrates the conventional edge shaping apparatus when in use. As shown, the two hands of the operator are placed on the wooden workpiece 20, and the workpiece 20 is pressed toward the support plate unit 14. The workpiece 20 is then pushed forward toward the cutter unit 12 so that the latter can form a desired surface 21 thereon.

The drawbacks of the conventional edge shaping apparatus are as follows:

1. Feeding of the wooden workpiece 20 is accomplished by manually pushing the wooden workpiece 20 toward the cutter unit 12. If the operator is not careful, his hands may be easily cut by the cutter unit 12.
2. When the wooden workpiece 20 is being processed by the edge shaping apparatus, the cutter unit 12 applies a force to the workpiece 20 in a direction away from the support plate unit 14. Thus, the operator has to exert a large amount of force to position properly the workpiece 20 during processing. After using the edge shaping apparatus for a period of time, the hands of the operator become tired, thereby resulting in failure to position the workpiece 20 properly on the worktable 10. This can result in damage to the workpiece 20 or in the operator being struck accidentally by the workpiece 20.

SUMMARY OF THE INVENTION

Therefore, the object of the present invention is to provide a workpiece feeding device for an edge shaping apparatus. The workpiece feeding device can overcome the aforementioned drawbacks of the conventional edge shaping apparatus to enhance safety features of the edge shaping apparatus when the latter is in use.

Accordingly, the workpiece feeding device of the present invention comprises: a base unit; a housing unit mounted uprightly on the base unit, the housing unit including a surrounding wall with a front wall portion, and a partition member which is connected integrally to the surrounding wall and which cooperates with the front wall portion so as to confine a pair of upright cylindrical receiving spaces, the front wall portion being formed with a pair of vertical slots to access respectively the cylindrical receiving spaces; a feeding cylinder unit including a pair of feeding cylinders received respectively in the cylindrical receiving spaces and mounted rotatably on the base unit, the feeding cylinders extending out of the cylindrical receiving spaces via the vertical slots; and drive means, connected operably to the feeding cylinders, for driving rotatably the feeding cylinders.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 3:
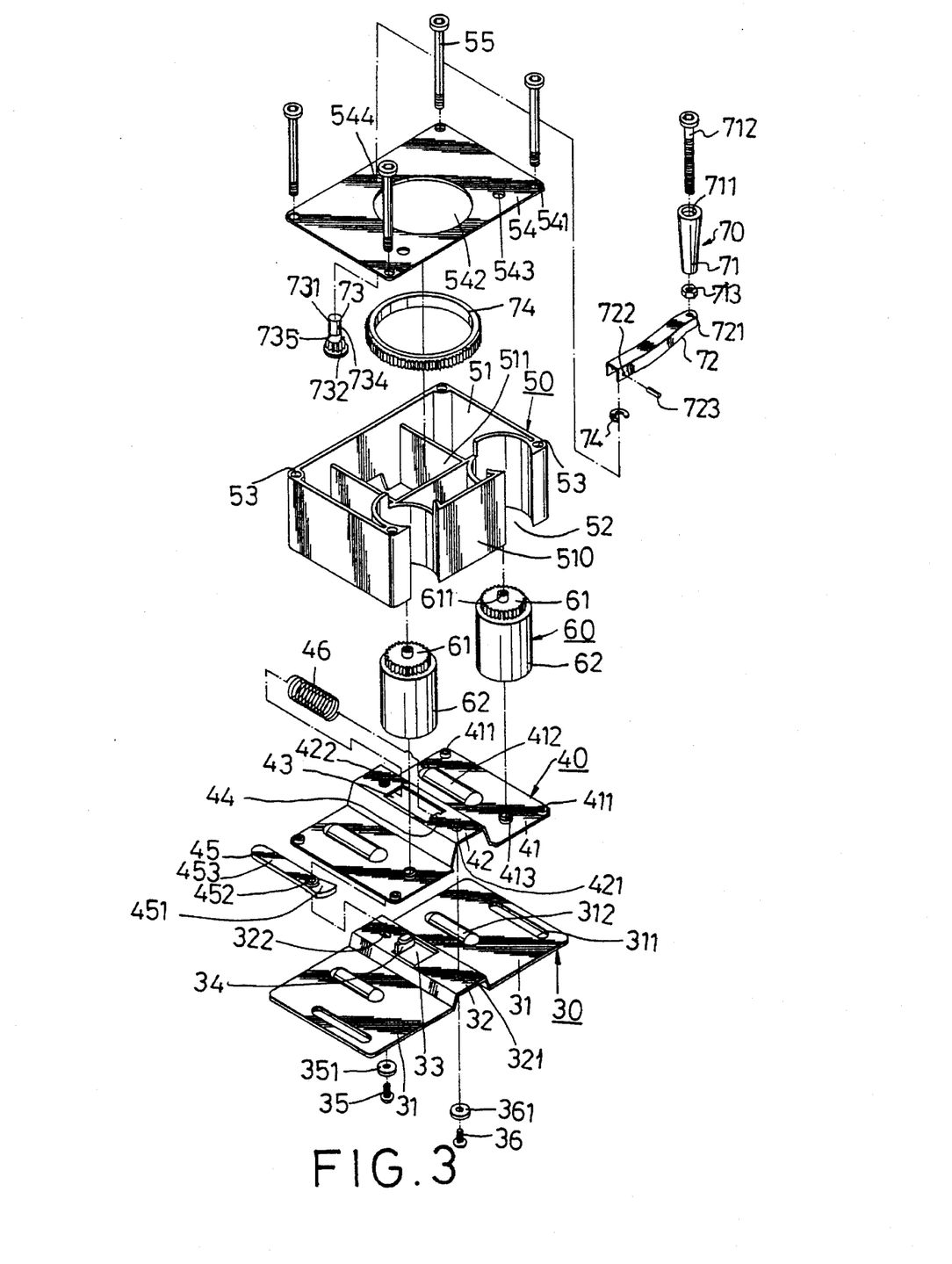
FIG. 3 is an exploded perspective view of the preferred embodiment of a workpiece feeding device for an edge shaping apparatus in accordance with the present invention.
Figure 4:
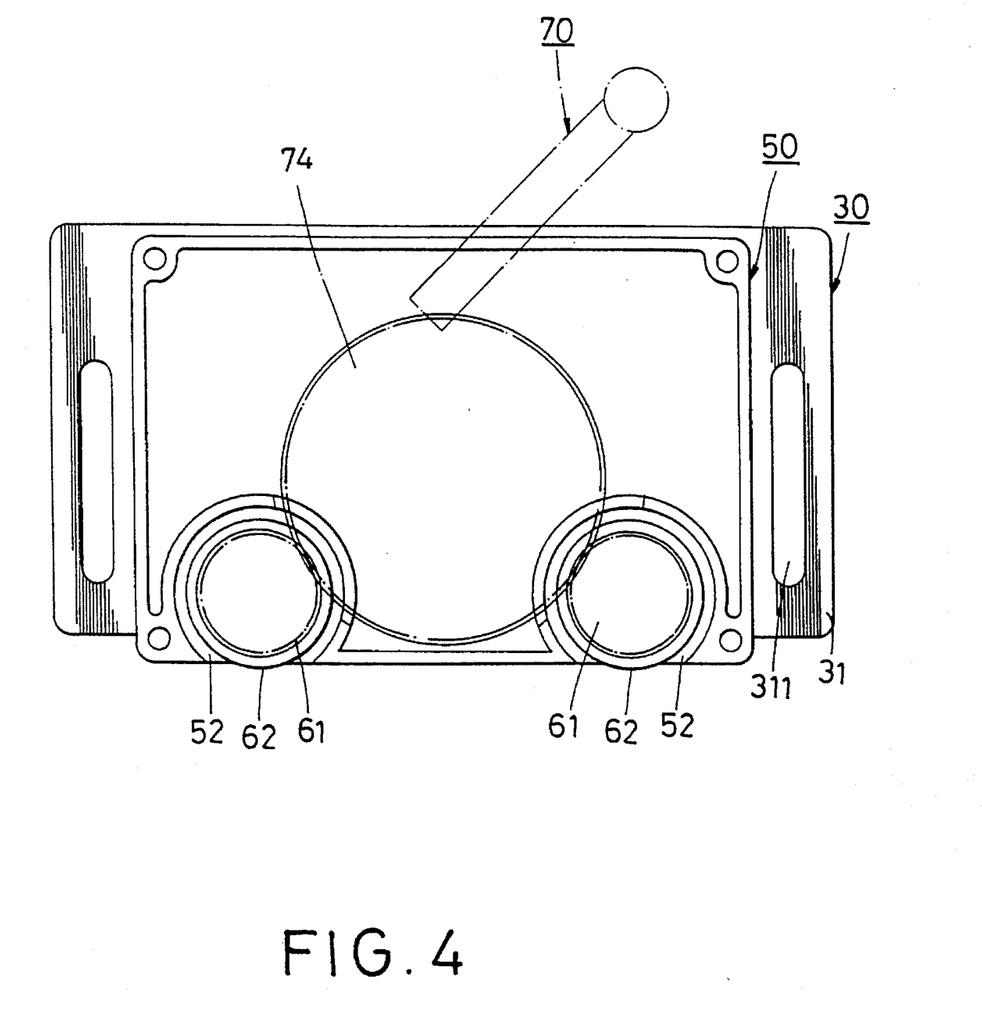
FIG. 4 is a top view of the preferred embodiment.
Figure 5:
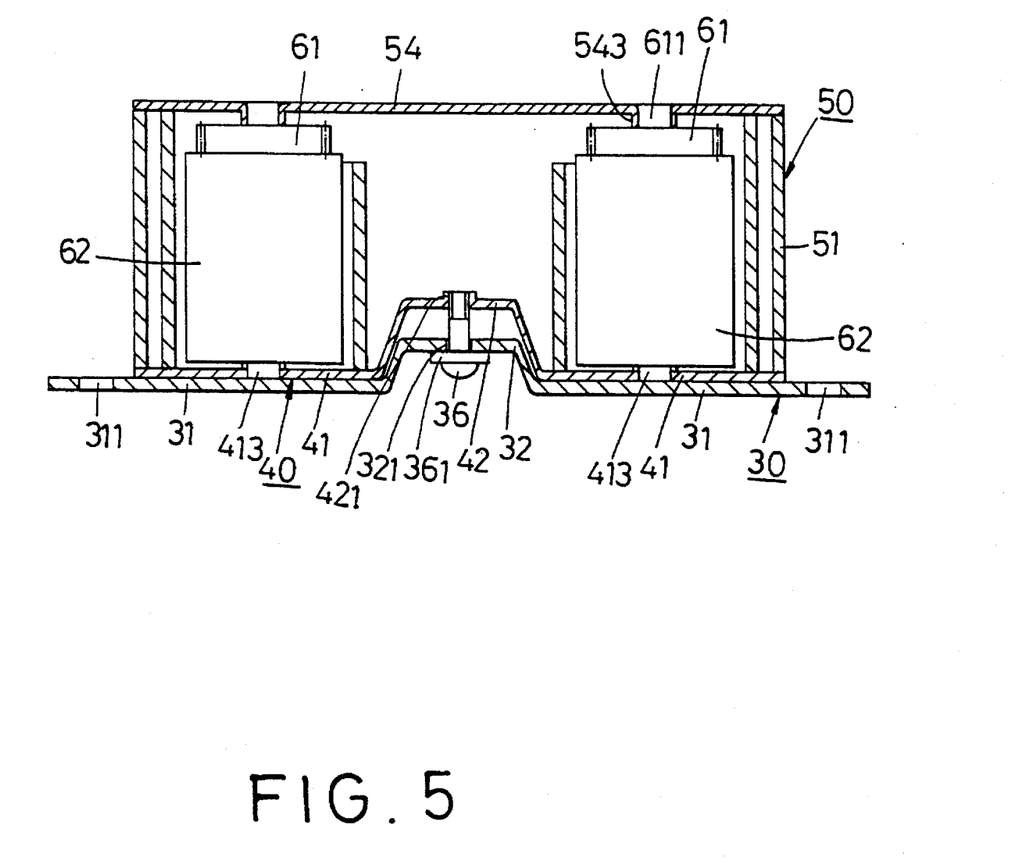
FIG. 5 is a sectional view illustrating assembly of the preferred embodiment.

Referring to FIGS. 3, 4 and 5, the preferred embodiment of a workpiece feeding device according to the present invention is shown to comprise a base unit, which includes a stationary base plate 30 and a slide plate 40, a housing unit 50, a feeding cylinder unit 60, and a drive unit 70. The stationary base plate 30 is to be mounted on the worktable 100 of an edge shaping apparatus (see FIG. 6). The slide plate 40 is mounted slidably on the base plate 30, and the housing unit 50 is mounted securely on the slide plate 40. The feeding cylinder unit 60 is disposed inside the housing unit 50 and is mounted rotatably on the slide plate 40. The drive unit 70 is mounted turnably on the housing unit 50 and is connected operably to the feeding cylinder unit 60 for driving rotatably the latter.

The stationary base plate 30 has front and rear edges, two side plate portions 31 formed respectively with an elongated mounting slot 311 that extends between the front and rear edges for mounting the base plate 30 on the worktable 100 of the edge shaping apparatus, and an intermediate plate portion 32 that projects upwardly relative to the two side plate portions 31. Each of the side plate portions 31 of the base plate 30 is formed with an upwardly projecting key 312. The intermediate plate portion 32 has front and rear end sections formed respectively with an oblong hole 321, 322 that extends between the front and rear edges of the base plate 30, and an elongated opening 33 that extends between the front and rear end sections of the intermediate plate portion 32. A spring mounting projection 34 is formed on one end of the elongated opening 33 adjacent the rear end section of the intermediate plate portion 32.

The slide plate 40, which is slidable between the front and rear edges of the base plate 30, has two side plate portions 41, each of which is shorter than the side plate portions 31 of the base plate 30 and is to be disposed on a respective one of the side plate portions 31. Each of the side plate portions 41 of the slide plate 40 has two corners formed respectively with a screw socket 411, and a bottom face that is formed with a keyway 412 that extends between front and rear edges of the slide plate 40 and that receives the key 312 on the respective one of the side plate portions 31 of the base plate 30 to guide sliding movement of the slide plate 40 relative to the base plate 30. Each of the side plate portions 41 of the slide plate 40 is further formed with a cylindrical positioning pin 413 that projects upwardly in front of the keyway 412. The slide plate 40 further has an intermediate plate portion 42 that projects upwardly relative to the two side plate portions 41 thereof and that is to be disposed on the intermediate plate portion 32 of the base plate 30. The intermediate plate portion 42 has front and rear end sections formed respectively with a threaded hole 421, 422 to be aligned with a corresponding one of the oblong holes 321, 322 in the base plate 30, and an elongated opening 43 that extends between the front and rear end sections thereof. A spring mounting projection 44 is formed on one end of the elongated opening 43 adjacent the front end section of the intermediate plate portion 42.

The threaded shank of each of two screw fasteners 35, 36 extends through a respective washer 351, 361, one of the oblong holes 322, 321 in the base plate 30, and engages threadedly one of the threaded holes 422, 421 in the slide plate 40, thereby mounting slidably the slide plate 40 on the base plate 30. The base unit further includes a cam lever 45 and a compression spring 46. The cam lever 45 has a head portion 451 to be disposed between the rear end sections of the intermediate plate portions 32, 42 of the base and slide plates 30, 40, and a tail portion 453 adapted to be gripped by a hand. The head portion 451 is formed with a pivot hole 452 and a cam edge that abuts the spring mounting projection 34 on the base plate 30. The screw fastener 35 further passes through the pivot hole 452 in the head portion 451 of the cam lever 45 to mount pivotally the cam lever 45 between the base and slide plates 30, 40. The compression spring 46 extends into the elongated openings 33, 43 in the base and slide plates 30, 40 and has two end portions secured respectively to the spring mounting projections 34, 44 on the base and slide plates 30, 40 to bias the spring mounting projections 34, 44 away from each other.

The housing unit 50 is mounted uprightly on the slide plate 40 and includes a rectangular surrounding wall 51 with a front wall portion 510, and a partition member 511 which is connected integrally to the surrounding wall 51 and which cooperates with the front wall portion 510 so as to confine a pair of upright cylindrical receiving spaces 52. The front wall portion 510 is formed with a pair of vertical slots to access respectively the cylindrical receiving spaces 52. The four corners of the surrounding wall 51 are formed with a respective hollow screw post 53. The housing unit 50 further includes a rectangular cover plate 54 disposed on the surrounding wall 51 to close an open top of the latter. The cover plate 54 has four corners formed with a respective through-hole 541 that is aligned with a respective one of the screw posts 53, a central portion formed with a circular downward projection 542, a front portion formed with a spaced pair of insert openings 543 on two sides of the circular downward projection 542, and a rear portion formed with a positioning hole 544 adjacent to the circular downward projection 542. The screw posts 53 are aligned with the screw sockets 411 on the slide plate 40. Bolts 55 extend through the through-holes 541 in the cover plate 54 and the screw posts 53 of the surrounding wall 51 and engage threadedly the screw sockets 411 on the slide plate 40, thereby mounting securely the housing unit 50 on the slide plate 40.

The feeding cylinder unit 60 includes a pair of feeding cylinders 62 received respectively in the cylindrical receiving spaces 52 of the housing unit 50 and mounted rotatably on the positioning pins 413 on the slide plate 40. Each of the feeding cylinders 62 has a top end provided with a sprocket 61. The feeding cylinders 62 extend out of the cylindrical receiving spaces 52 via the vertical slots in the front wall portion 510 of the surrounding wall for positioning a workpiece 80 (see FIG. 6) when the edge shaping apparatus is in use. This will be described in greater detail in the succeeding paragraphs. The top end of each of the feeding cylinders 62 is further provided with an axial positioning shaft 611 which extends into a respective one of the insert openings 543 in the cover plate 54.

The drive unit 70 is used to drive rotatably the feeding cylinder unit 60 and includes a gear wheel 74 disposed in the housing unit 50 on top of the partition member 511 and mounted rotatably on the cover plate 54 by sleeving rotatably the gear wheel 74 on the circular downward projection 542 at the bottom face of the cover plate 54. The gear wheel 74 meshes with the sprockets 61 on the feeding cylinders 62. The drive unit 70 further includes a drive gear 73 and a handle lever having a handle body 71 and a lever body 72.

The drive gear 73 meshes with the gear wheel 74 and has a bottom formed with a large-diameter support plate 32. The drive gear 73 further has a shaft member 731 that extends through the positioning hole 544 in the cover plate 54 of the housing unit 50 and that is formed with a radial pin hole 734 and an annular groove 735 below the pin hole 734. A C-shaped locking ring 74 engages the shaft member 731 in the annular groove 735 to mount rotatably the shaft member 731 to the cover plate 54.

The handle body 71 is adapted to be gripped by a hand and is formed as a generally cylindrical shaft with an axial hole 711 provided therethrough. A screw 712 extends through the axial hole 711 and engages a nut 713 and a threaded hole 721 on a rear end of the lever body 72 to mount uprightly the handle body 71 on the lever body 72. The lever body 72 is an elongated member with an inverted U-shaped cross-section. The front end of the lever body 72 is formed with a pin hole 722 to be aligned with the pin hole 734 in the shaft member 731 of the drive gear 73. A locking pin 723 extends through the pin holes 722, 734 to mount the front end of the lever body 72 on the shaft member 731 of the drive gear 73.

The operation of the preferred embodiment will now be described in the following paragraphs.

Figure 6:
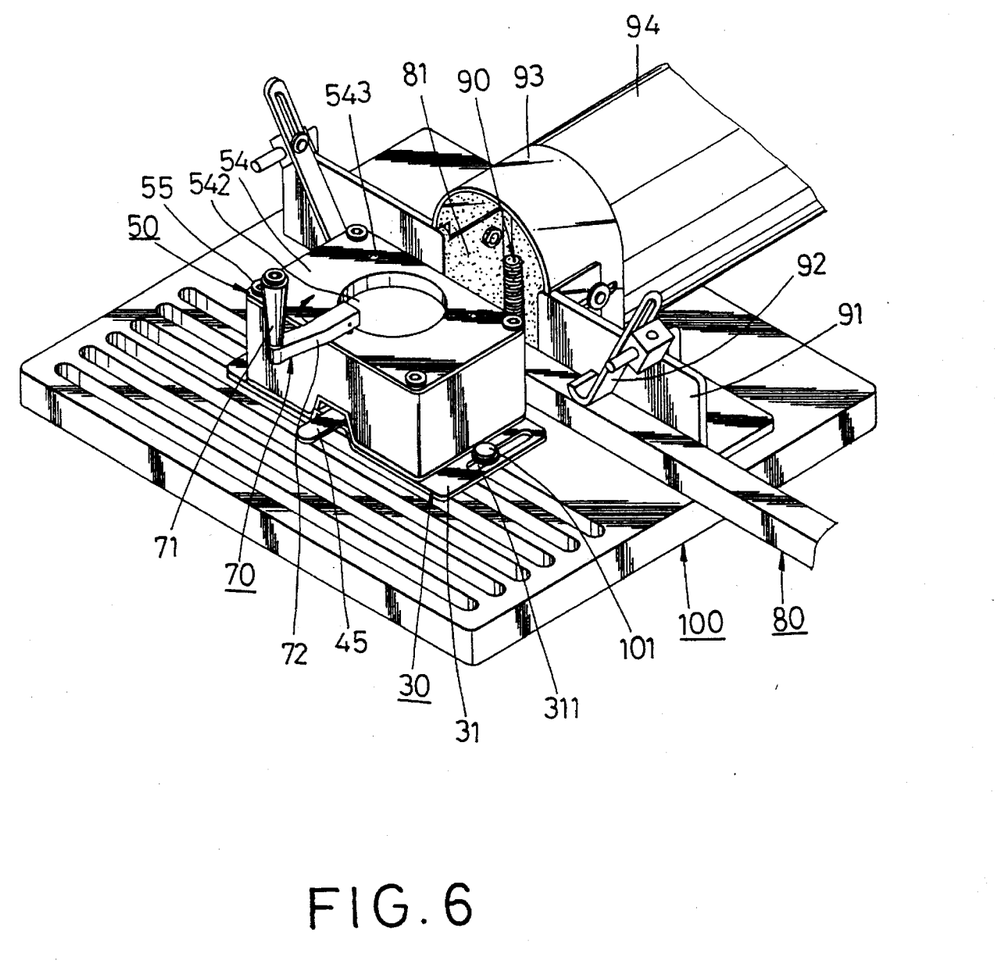
FIG. 6 is a perspective view which illustrates the preferred embodiment when used in combination with an edge shaping apparatus.

Referring to FIG. 6, the preferred embodiment is to be used in combination with an edge shaping apparatus similar to that shown in FIGS. 1 and 2. The edge shaping apparatus includes a worktable 100, a height-adjustable cutter seat 90 provided on the worktable 100 and having a cutter unit (not shown) mounted replaceably thereon, and a support plate unit 91 mounted uprightly at two sides of the cutter seat 90 to support one edge of a wooden workpiece 80 thereon. The support plate unit 91 is provided with a pair of press members 92 for pressing the workpiece 80 toward the worktable 100. A cover member 93 is disposed on one side of the support plate unit 91 adjacent to the cutter seat 90 to prevent wood shavings 81 from flying into the eyes of an operator. A vacuum tube 94 is disposed on one end of the cover member 93 and serves to suction the wood shavings 81 thereinto to prevent accumulation of the wood shavings 81 on the worktable 100 and on the ground so as to obviate the need for an additional task of removing the wood shavings 81 therefrom, and to prevent the wood shavings 81 from becoming a source of air pollution which may endanger the health of the operator.

The thickness of the workpiece 80 to be processed determines the required space between the cutter seat 90 of the edge shaping apparatus and the workpiece feeding device of the present invention. As shown in FIG. 6, screws 101 (only one is shown) extend through the mounting slots 311 in the side plate portions 31 of the base plate 30 and engage threadedly previously formed screw holes (not shown) in the worktable 100 to secure the workpiece feeding device on the latter. Because the mounting slots 311 are elongated slots, the locked position of the base plate 30 relative to the cutter seat 90 can be adjusted so as to correspond with the thickness of the workpiece 80.

Figure 7:
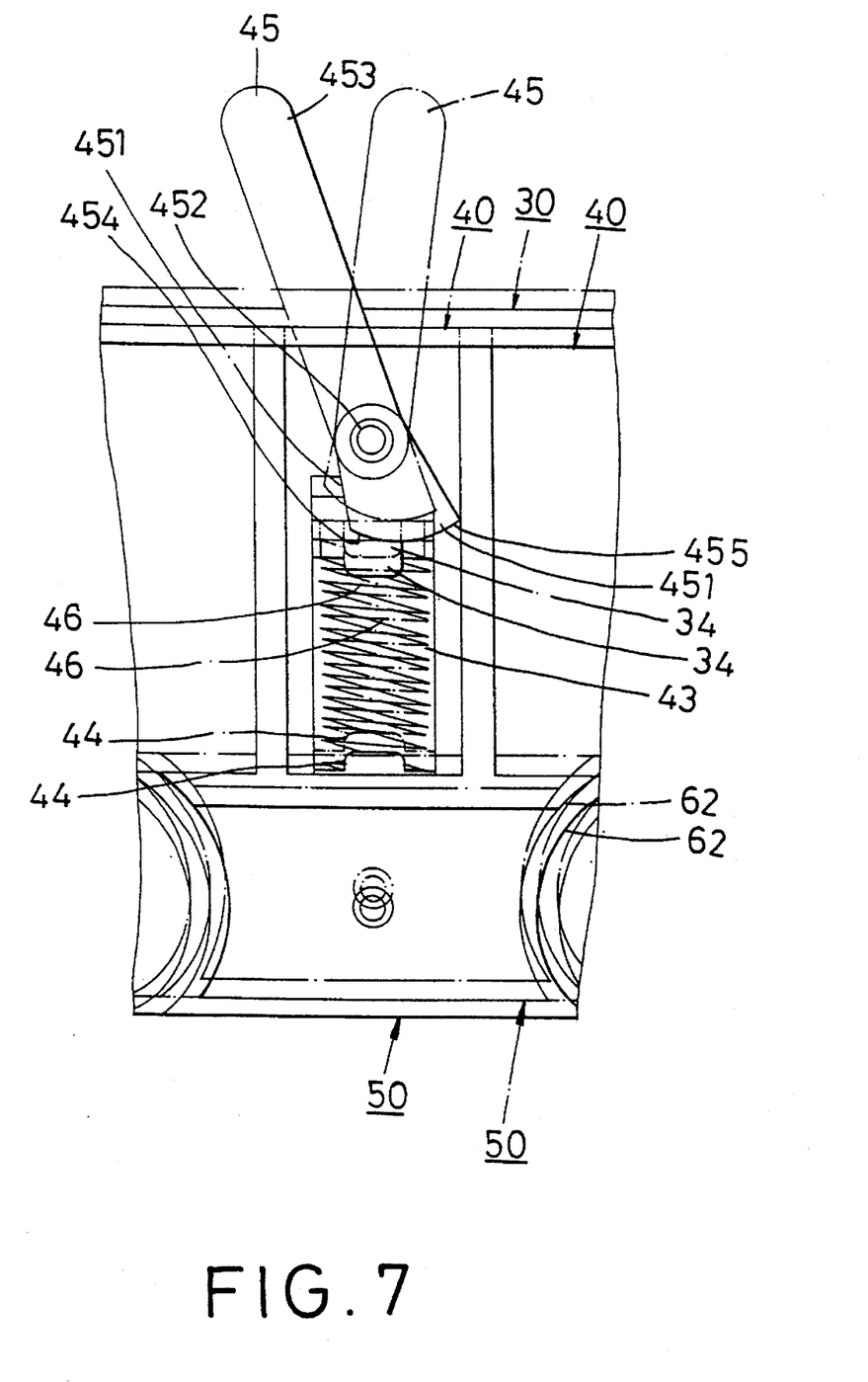
FIG. 7 illustrates how a slide plate of a base unit of the preferred embodiment is moved relative to a stationary base plate in accordance with the present invention.

Referring to FIGS. 3 and 7, when processing a workpiece 80, the cam lever 45 is rotated from a first position, where the least protruding portion 454 of the cam edge of the head portion 451 of the cam lever 45 abuts the spring mounting projection 34 of the base plate 30 (as shown by the solid lines), to a second position, where the most protruding portion 455 of the cam edge of the head portion 451 abuts the spring mounting projection 34 (as shown by the dotted lines). Because the base plate 30 is locked onto the worktable 100, rotation of the cam lever 45 in the aforementioned manner will result in the application of a rearward pulling force on the screw fastener 35, thereby moving the slide plate 40 rearward relative to the base plate 30 and compressing the spring 46 at the same time. Since the screw fasteners 35, 36 extend through the oblong holes 322, 321 in the base plate 30, and since the keys 312 on the base plate 30 extend into the keyways 412 in the slide plate 40, smooth sliding movement of the slide plate 40 relative to the base plate 30 is ensured.

When the slide plate 40 moves rearward, corresponding rearward movement of the housing unit 50 and the feeding cylinders 62 that are secured thereon occurs. Thus, minor adjustments in the distance between the housing unit 50 and the support plate unit 91 of the edge shaping apparatus is permitted to allow extension of the wooden workpiece 80 therebetween. After the workpiece 80 has been positioned on the worktable 100, such that one edge of the workpiece 80 rests on the support plate unit 91 while the top side of the workpiece 80 is pressed by the press members 92 toward the worktable 100, the cam lever 45 is rotated in the opposite direction from the second position to the first position. At this stage, the compression spring 46 expands to move the slide plate 40 forwardly to permit the feeding cylinders 62, which extend out of the cylindrical receiving spaces 52 via the vertical slots in the front wall portion 510 of the surrounding wall 51 of the housing unit 50, to press the workpiece 80 tightly toward the support plate unit 91.

Referring to FIG. 6, rotation of the handle lever of the drive unit 70 will cause the drive gear 73 to drive rotatably the gear wheel 63 to rotate, in turn, the feeding cylinders 62, thereby causing the workpiece 80 to advance relative to the cutter unit (not shown) on the cutter seat 90. Therefore, feeding of the workpiece 80 is easily accomplished by mere rotation of the handle lever of the drive unit 70. Thus, there is no need to manually push the workpiece 80 toward the cutter unit as required in the known art, thereby minimizing the risk that the hands of the operator will be cut by the cutter unit of the edge shaping apparatus. In addition, when the workpiece 80 is being processed by the edge shaping apparatus, the press members 92 press the workpiece 80 toward the worktable 100 to prevent upward movement of the workpiece 80, while the feeding cylinders 62 press the workpiece 80 toward the support plate unit 91 to prevent lateral movement of the same. Thus, improper positioning of the workpiece 80 during processing can be avoided to prevent damage to the workpiece 80 or accidental striking of the operator by the workpiece 80 due to improper positioning of the workpiece 80.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A workpiece feeding device for use with an edge shaping apparatus, said workpiece feeding device comprising:

a base unit;

a housing unit mounted uprightly on said base unit, said housing unit including a surrounding wall with a front wall portion, and a partition member which is connected integrally to said surrounding wall and which cooperates with said front wall portion so as to define a pair of upright cylindrical receiving spaces, said front wall portion being formed with a pair of vertical slots to access respectively said cylindrical receiving spaces;

a feeding cylinder unit including a pair of feeding cylinders received respectively in said cylindrical receiving spaces and mounted rotatably on said base unit, said feeding cylinders extending out of said cylindrical receiving spaces via said vertical slots; and drive means, connected operably to said feeding cylinders, for driving rotatably said feeding cylinders.

2. The workpiece feeding device as claimed in claim 1, wherein said base unit comprises a stationary base plate having front and rear edges, and a slide plate mounted slidably on said base plate, said housing unit and said feeding cylinders being mounted on said slide plate, said slide plate being slidable between said front and rear edges of said base plate.

3. The workpiece feeding device as claimed in claim 2, wherein said base plate has two side plate portions formed respectively with an elongated mounting slot that extends between said front and rear edges.

4. The workpiece feeding device as claimed in claim 3, wherein said slide plate has two side plate portions, each of which being disposed on a respective one of said side plate portions of said base plate.

5. The workpiece feeding device as claimed in claim 3, wherein each of said side plate portions of said base plate is formed with an upwardly projecting key, each of said side plate portions of said slide plate having front and rear edges and a bottom face that is formed with a keyway that extends between said front and rear edges and that receives said key on the respective one of said side plate portions of said base plate to guide sliding movement of said slide plate relative to said base plate.

6. The workpiece feeding device as claimed in claim 4, wherein:

said base plate further has an intermediate plate portion that projects upwardly relative to said two side plate portions thereof, said intermediate plate portion having front and rear end sections formed respectively with an oblong hole that extends between said front and rear edges of said base plate;

said slide plate further has an intermediate plate portion that projects upwardly relative to said two side plate portions thereof and that is disposed on said intermediate plate portion of said base plate, said intermediate plate portion of said slide plate having front and rear end sections formed respectively with a threaded hole aligned with one of said oblong holes in said base plate; and said base unit further includes a pair of screw fasteners, each of which extending through one of said oblong holes in said base plate and engaging threadedly one of said threaded holes in said slide plate to mount slidably said slide plate on said base plate.

7. The workpiece feeding device as claimed in claim 6, wherein:

said intermediate plate portion of said slide plate is formed with an elongated opening that extends between said front and rear end sections thereof, and a spring mounting projection on one end of said elongated opening adjacent said front end section of said intermediate portion of said slide plate;

said intermediate plate portion of said base plate is formed with an elongated opening that extends between said front and rear end sections thereof, and a spring mounting projection on one end of said elongated opening adjacent said rear end section of said intermediate portion of said base plate; and said base unit further includes a compression spring extending into said elongated openings in said base and slide plates and having two end portions secured respectively to said spring mounting projections on said base and slide plates to bias said spring mounting projections away from each other.

8. The workpiece feeding device as claimed in claim 7, wherein said base unit further comprises a cam lever having a head portion disposed between said rear end sections of said intermediate plate portions of said base and slide plates and mounted pivotally therebetween by one of said screw fasteners, said head portion being formed with a cam edge abutting said spring mounting projection on said base plate.

9. The workpiece feeding device as claimed in claim 8, wherein:

said housing unit further includes a cover plate mounted on said surrounding wall to close an open top of said surrounding wall;

each of said feeding cylinders has a top end provided with a sprocket; and said drive means includes a gear wheel mounted rotatably on said cover plate of said housing unit and meshing with said sprocket on said feeding cylinders.

10. The workpiece feeding device as claimed in claim 9, wherein said gear wheel is mounted rotatably on a bottom face of said cover plate, said drive means further comprising:

a drive gear meshing with said gear wheel and having a shaft member that is mounted rotatably to and that extends through said cover plate of said housing unit; and a handle lever having a rear end portion adapted for gripping, and a front end portion mounted to said shaft member of said drive gear;

whereby, rotation of said handle lever causes corresponding rotation of said drive gear to rotate, in turn, said gear wheel and said feeding cylinders.

\* \* \* \* \*